United States Patent [19]

Ishii

[11] Patent Number: 4,609,857
[45] Date of Patent: Sep. 2, 1986

[54] PULSE MOTOR DRIVING CIRCUIT FOR FLOPPY DISC

[75] Inventor: Hiroshi Ishii, Kashihara, Japan

[73] Assignee: Sharp Kabushiki Kaisha, Osaka, Japan

[21] Appl. No.: 654,143

[22] Filed: Sep. 25, 1984

[30] Foreign Application Priority Data

Sep. 30, 1983 [JP] Japan ................................ 58-184287

[51] Int. Cl.$^4$ ............................................ G05B 19/40
[52] U.S. Cl. .................................... 318/696; 318/343; 318/254; 318/685
[58] Field of Search ............... 318/254, 685, 696, 776, 318/122, 123, 126, 127, 164, 248, 343, 523, 672; 360/52, 70, 71, 73, 74, 75, 86, 87, 101

[56] References Cited

U.S. PATENT DOCUMENTS 2,896,144  7/1959  Mollenberg ........................ 318/776
4,382,693  5/1983  Tu Xuan ........................ 318/696 X
4,415,845  11/1983  Oudet ................................ 318/696

FOREIGN PATENT DOCUMENTS 52-66913  6/1977  Japan .................................... 318/696

OTHER PUBLICATIONS

IBM Technical Disclosure Bulletin, vol. 23, No. 1, Jun. 1980, pp. 41–42.

Primary Examiner—Bernard Roskoski
Assistant Examiner—Bentsu Ro
Attorney, Agent, or Firm—Birch, Stewart, Kolasch & Birch

[57] ABSTRACT

A driving circuit for driving a pulse motor so as to move a head for a floppy disc supplies power to two phase coils using first applying means for directly applying the voltage of the power source to the phase coils while the head is moved, and second applying means for dividing the voltage of the power source to substantial halves by connecting the phase coils in series and for applying the substantial half of the voltage into each of the phase coils while the head is stopped during a waiting mode.

5 Claims, 2 Drawing Figures

| EXCITING CONDITION | CURRENT DIRECTION OF COIL | | | EXCITING SIGNAL | | | | TRANSISTOR TO TURN ON | | | |
|---|---|---|---|---|---|---|---|---|---|---|---|
| | | | | | | | | Pon=1 | | Pon=0 | |
| | COIL 2 | COIL 3 | | A | $\bar{A}$ | B | $\bar{B}$ | A PHASE | B PHASE | A PHASE | B PHASE |
| I | + | + | | 0 | 1 | 0 | 1 | Q1, Q5 | Q7, Q11 | Q1, Q6 | Q9, Q11 |
| II | + | − | | 0 | 1 | 1 | 0 | Q1, Q5 | Q8, Q10 | Q1, Q6 | Q12, Q8 |
| III | − | − | | 1 | 0 | 1 | 0 | Q2, Q4 | Q8, Q10 | Q3, Q4 | Q12, Q8 |
| IV | − | + | | 1 | 0 | 0 | 1 | Q2, Q4 | Q7, Q11 | Q3, Q4 | Q9, Q11 |

Fig. 2

PULSE MOTOR DRIVING CIRCUIT FOR FLOPPY DISC

BACKGROUND OF THE INVENTION

The present invention relates to a pulse motor driving circuit and, more particularly to an improved pulse motor circuit for driving a floppy disc of the four-phase bipolar type to stably move a head by reducing heat radiation.

In recent years, floppy disc devices each having a head and a pulse motor for driving the head have been developed and are widely used as external storage device for storing data or information from a computer, a personal computer or a word processor, or the like.

Generally, to reduce the power consumption of the pulse motor in order to control heat radiation, two powers +5 V and +12 V outputted from external power sources are applied to internal circuits including the pulse motor. For example, while the head of the floppy disc device is moved, 12 V power is applied to the pulse motor for driving the head. After the movement of the head is completed, the pulse motor driving voltage is changed from 12 V to 5 V so as to dispose the head at the waiting position while waiting for the next movement.

In case where a single power source of +5 V is used as a device for supplying into the internal circuits of the floppy disc so as to simplify the power source, the following methods are used for reducing the driving voltage for the pulse motor while the head is disposed at the waiting position while waiting for the next movement:

(1) An effective driving voltage for the pulse motor is reduced by a chopper control while the head is at the waiting position waiting for the next movement.

(2) A low voltage for driving the head while at the waiting position for the next movement is applied by switching the external 5 V power source, using controls inside the floppy disc device, so that the pulse motor driving voltage is reduced similar to using the two power sources in the conventional manner.

(3) The power from the external voltage source is applied to the driving circuit for the pulse motor via a resistance while the head is at the waiting position for the next movement, so that the driving voltage for the pulse motor is reduced by a voltage drop of the resistance.

In the methods (1) and (2), it may happen that the floppy disc is deteriorated because a noise, caused by switching, damages a head reproducing system. In method (3), it may happen that the resistance radiates an excess heat.

SUMMARY OF THE INVENTION

Accordingly, it is an object of the present invention to provide an improved pulse motor driving circuit for reducing a driving voltage from a single power source so as to control heat radiation from the pulse motor when a head of a floppy disc is in a waiting position for a next movement.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

According to an embodiment of the present invention, a driving circuit for driving a pulse motor so as to move a head for a floppy disc comprises a power source, phase coils, first applying means for directly applying the voltage of the power source to the phase coils while the head is moved, and second applying means for dividing the voltage of the power source to substantial halves by connecting the phase coils in series and for applying the substantial half of the voltage into each of the phase coils while the head is stopped as waiting.

The first applying means and the second applying means comprise a plurality of transistors, AND gates, and NAND gates. The pulse motor is driven in a four phase mode.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 2 shows a truth table of explaining the driving of a pulse motor for moving a head for a floppy disc.

DETAILED DESCRIPTION OF THE INVENTION

Figure 1:
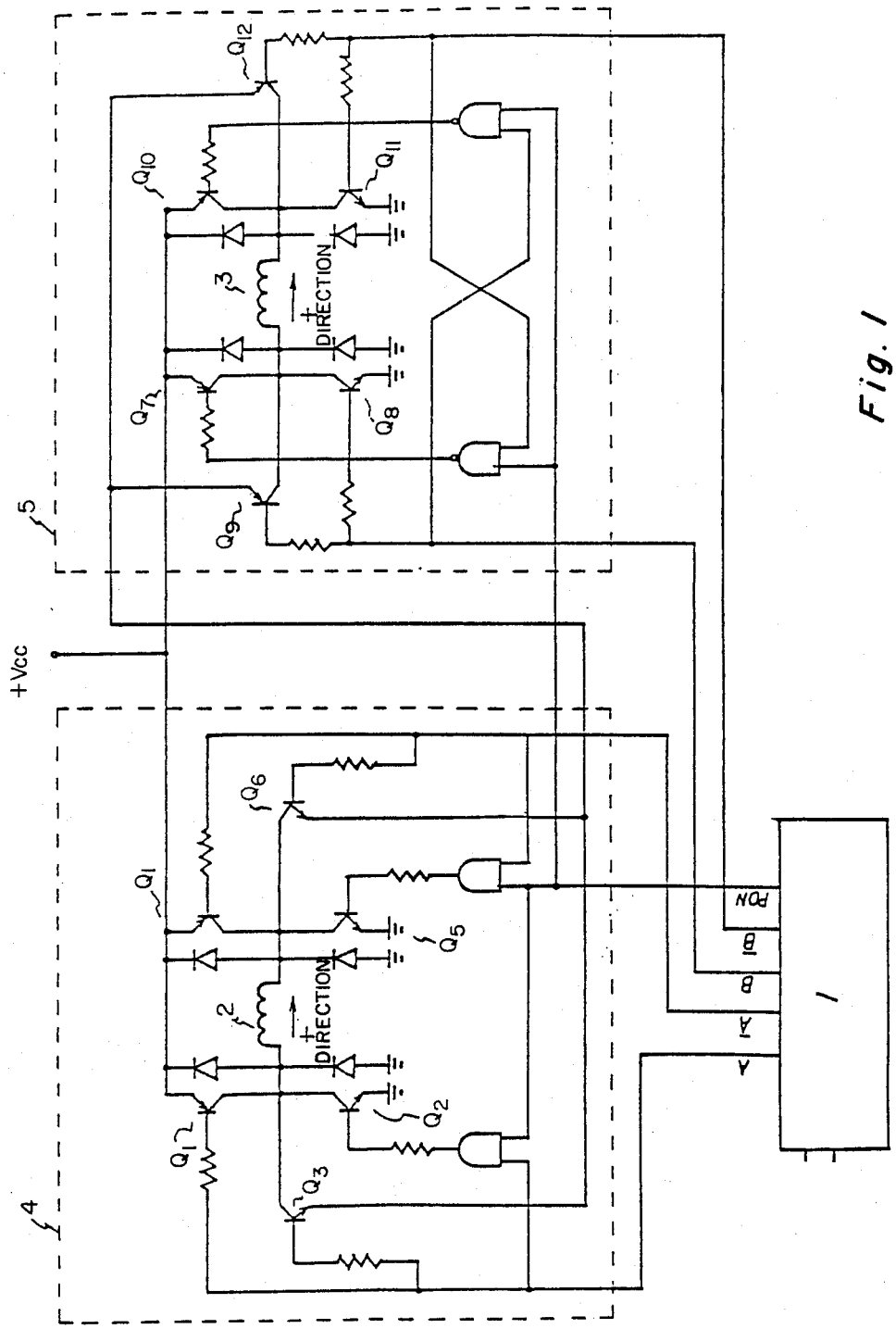
FIG. 1 shows a circuit diagram of a pulse motor driving circuit according to an embodiment of the present invention.

FIG. 1 shows a circuit diagram of a pulse motor driving circuit according to an embodiment of the present invention. FIG. 2 shows a truth table of explaining the driving principle of the pulse motor for moving a head for a floppy disc.

The pulse motor driving circuit comprises an A-phase driving circuit 4 including transistors Q1 through Q6, and a B-phase driving circuit 5 including transistors Q7 through Q12.

A base of each of the transistors Q1 through Q12 is connected to a resistance in series. Diodes are connected to the transistors Q1, Q2, Q4, Q5, Q7, Q8, Q10, and Q11 in parallel, respectively. Collectors of the transistors Q1 through Q6 are connected to one end of an A-phase coil 2, and collectors of the transistors Q7 through Q12 are connected to one end of a B-phase coil 3.

Emitters of the transistors Q2, Q5, Q8, and Q11 are grounded, respectively. The A-phase driving circuit 4 has two AND gates in which the output of each of the AND gates is connected to a base of each of the transistors Q2 and Q5. The B-phase driving circuit 5 has two NAND gates in which the output of each of the NAND gates is connected to a base od each of the transistors Q7 and Q10.

The pulse motor driving circuit is connected to a single power supply source of +Vcc volts.

The pulse motor driving circuit is connected to a controller 1 for the floppy disc. The controller 1 outputs exciting signals A, $\bar{A}$, B, and $\bar{B}$ for exciting the A-phase coil 2 and the B-phase coil 3, respectively, and a switching signal Pon for switching motor driving voltages in response to control instruction signals inputted from external circuits.

The switching signal Pon is a "1" (high) level signal while the pulse motor for moving the head of the floppy disc is driven. The switching signal Pon is a "0" (low) level signal so as to place the head in the waiting position for waiting for the next movement, after a predetermined period from the completion of the driving of the pulse motor.

As shown in FIG. 2, when the control circuit 1 drives the pulse motor in the clockwise direction, exciting conditions are recycled from a "I" state to a "IV" state through a "II" state and a "III" state by the control circuit 1. If the control circuit 1 drives the pulse motor in the counterclockwise direction, the exciting conditions are recycled from the "I" state to the "II" state through the "IV" state and the "III" state by the control circuit 1.

Referring to the table of truth values of the pulse motor driving circuit of FIG. 1, the switching signal Pon is placed on the "1" level signal when driving the pulse motor so that the transistors Q3, Q6, Q9, and Q12 are turned off, the result being that the driving voltage of each of the A- and B-phase coils 2 and 3 substantially becomes the power voltage Vcc from the power source.

After the driving of the pulse motor is completed so that the head of the floppy disc is placed in the waiting position for the next movement, the switching signal Pon becomes the "0" level signal and the transistors Q2, Q5, Q7, and Q10 are turned off, so that the A-phase driving circuit 4 and the B-phase driving circuit 5 are cascaded with each other. Accordingly, a voltage which is calculated as dividing the power voltage Vcc into substantial halves is applied to each of the A- and B-phase coils 2 and 3 as the driving voltage.

As described above, according to the pulse motor driving circuit of the present invention, the A- and B-phase driving circuits are cascaded with each other when the head for the floppy disc is placed in the waiting position for the next movement, so that the power voltage, which is applied from the external power source, is divided into substantial halves and the half of the power voltage from the power source is applied to the pulse motor in the waiting position. Therefore, a consumption power in the internal circuits of the floppy disc may be reduced together with a reduction of heat radiation, and electrical noise is not produced because the driving of the pulse motor is not controlled by chopper switching.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A drive for moving a head in a memory disc reading apparatus comprising:
    a power source developing a supply voltage;
    a pulse motor connected to move said head and including two driving phase coils;
    means for supplying pulses of said supply voltage to said phase coils of said pulse motor in a desired manner so as to drive the motor in a movement mode and so as to hold said motor in position in a wait mode;
    cascade means for serially connecting said phase coils in said hold mode so as to reduce the effective voltage supplied thereto by dividing said supply voltage.

2. A driving circuit for driving a pulse motor so as to move a head in a memory disc reading apparatus comprising:
    a power source developing a supply voltage;
    a motor connected to move said head and including two driving phase coils;
    first means for applying said supply voltage of said power source directly to each said phase coil to move said head;
    second means for connecting said phase coils in series to divide said supply voltage so as to supply a reduced voltage to each said coil, said coils being connected so as to develop opposing forces in said motor to place said head in a waiting position.

3. The driving circuit of claim 2, wherein the first means and the second means each comprise a plurality of transistors, an AND gate, and a NAND gate.

4. The driving circuit of claim 2, wherein the pulse motor is driven in a four phase mode.

5. The driving circuit of claim 2 wherein said memory disc reading apparatus is a floppy disc drive.

* * * * *